United States Patent Office 3,825,515
Patented July 23, 1974

3,825,515
PROCESS FOR IMPROVING THE PROPERTY PROFILE OF RUBBER-POLYMER SYSTEMS
Howard Robert Lucas, Danbury, and Robert Nils Olsen, Norwalk, Conn., assignors to American Cyanamid Company, Stamford, Conn.
No Drawing. Filed June 13, 1973, Ser. No. 369,662
Int. Cl. C08f 45/40
U.S. Cl. 260—31.8 M         11 Claims

ABSTRACT OF THE DISCLOSURE

The incorporation of a dialkyl phthalate into rubber-polymer composition components before the blending, devolatilization and extrusion thereof has been found to improve the property profile of the resultant systems.

BACKGROUND OF THE INVENTION

U.S. Pat. No. 3,345,321, hereby incorporated herein by reference, teaches the advantages of pretreating mixtures of non-rubbery, resinous, thermoplastic polymer solutions and natural or synthetic rubber dispersion by continuously subjecting them to subdivision and recombination so as to produce both microscopic and macroscopic dispersions thereof before devolatilizing and extruding the resultant dispersions into molding compositions.

The products produced by the process of the above-identified patent, while being excellent all around materials with respect to their properties such as impact strength etc. have been found to be somewhat less attractive with regard to their haze. That is to say, the existence of haziness in the molding compositions has rendered them less attractive for service applications wherein less haze, i.e. greater light transmission, is required. Such applications e.g. interior building panels etc., require high degrees of light transmission in order to make the greatest use of available lighting facilities.

SUMMARY

We have now found that the incorporation of a dialkyl phthalate into the components which are formed into such molding compositions not only materially improves the percent haze in articles molded therefrom but unexpectedly also enhances the overall property profile of these articles. The chemical as well as the mechanical properties of the molded articles are, for the most part, materially improved due to the presence of the phthalate additive.

DESCRIPTION OF THE INVENTION INCLUDING PREFERRED EMBODIMENTS

As mentioned above, we have now discovered that the incorporation of a small amount of a dialkyl phthalate having (I) 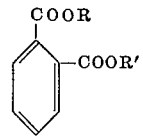

wherein R and R$^1$ are, individually, alkyl radicals of from 4–10 carbon atoms, inclusive, into the components utilized to prepare a high impact molding composition materially enhances the overall property profile of articles manufactured therefrom in addition to greatly improving the percent haze thereof.

The dialkyl phthalates may be added to either or both of the components used to form the molding compositions. More particularly, the dialkyl phthalate may be added to the solution of the non-rubbery, resinous thermoplastic polymer, the natural or synthetic rubber dispersion or both without detracting from the advantageous results achieved by the addition thereof. The dialkyl phthalate may be added so as to constitute from about 0.5% to about 15%, by weight, based on the total weight of the thermoplastic polymer and the rubber, with amounts ranging from about 1.0% to about 10.0%, same basis being preferred.

Examples of suitable dialkyl phthalates conforming to Formula I, above, include n-decyl iso-octyl phthalate; n-decyl n-octyl phthalate; dioctyl phthalate; dibutyl phthalate; butyl 2-ethylhexyl phthalate; diisodecyl phthalate; 2-ethylhexyl isodecyl phthalate; bis(2-ethylhexyl) phthalate and the like. Mixtures thereof may also be used.

The dialkylphthalate may be added to the components which go to make up the ultimate molding compositions at any time during the pretreatment, devolatilization or extrusion thereof, however, the most advantageous results are seen when the phthalate addition to the components precedes the pretreatment step of the process.

As previously discussed, the instant invention is a basic improvement of that process disclosed and claimed in the above-identified U.S. patent. Generally, the process set forth therein employs the resinous polymer component (A) as a solution while the elastic, rubbery component (B) is dispersed either in a solution or as a colloidal emulsion.

It will be apparent therefore that the term "rubbery dispersion" includes a solution, i.e., a dispersion of rubber in a solvent, as well as rubber in latex form. The solvent employed for either of the components, i.e., the resin or the rubbery elastomer may be any of the known solvents which are suitable therefor, such as toluene, xylene, etc. It is preferred that the rubber be used in latex form. For example, if the resinous molding compositions are a blend of a terpolymer of methyl methacrylate/styrene/acrylonitrile and a grafted polybutadiene rubber, the solvent employed in making the solution of the terpolymer to be blended is preferably xylene or toluene and the polybutadiene is in latex form. In an alternative manner, an SBR elastomer (styrene-butadiene type synthetic rubber) or a modified elastomer may be employed in latex form, the proportion of rubbery solid in the dispersion comprising between about 30% and 60% of the emulsion.

In preparing the solution of resinous polymer (A), it is preferred that the solution contain not more than about 80% polymer in solution and preferably at least 45% polymer. Amounts of polymer greater than 80% tend to result in difficulties in handling the material. It is apparent that the step of dissolving the preformed polymer to form the solution of the hard resin component (A) may be avoided and such solution may be derived directly from the polymerization of the monomers. It is thus preferred that not more than about 80% polymer be present in the solution of the resinous component.

The resinous component (A) and the rubbery component (B) are pretreated to form a mixture thereof prior to devolatilization and extrusion. The pretreatment comprises contacting component (A) and component (B) at a temperature ranging from about 50° C. to about 110° C., preferably about 70° C. to about 100° C. at atmospheric pressure. Temperatures below 50° C. tend to create difficulty in handling the components because the viscosity of component (A) is such that the working thereof is practically impossible at lower temperatures. The maximum temperature is governed by the boiling point of the solvent employed in forming the solution of the polymer and the rubber component. If a rubber latex is employed the boiling point of water (100° C.) governs the maximum temperature, however, pressure above atmospheric, i.e., up to about 5 p.s.i. preferably not over 50 p.s.i., and thereby slightly higher temperatures may be used. While at these pressures and temperatures, the combined components (A) and (B) are held for a period of from about 1 minute to about 30 minutes, preferably about 2 to 10 minutes, while they are continuously subjected to continued subdivision and recombination action effected by shearing, thereby producing a uniform composition having both a microscopic and a macroscopic dispersion of the components.

Any type of apparatus which functions so as to perform such a pretreatment on the resinous polymer solution and the rubbery latex dispersion or solution may be used. One type of apparatus which may be used is of a commercially available design and comprises a chamber which contains a single, horizontal shaft with an interrupted screw thereon, said screw possessing flights constructed so as to move the rubber latex and resinous solution being treated in a forward direction. Stationary anvils, attached to the housing may be inserted into the interruptions of the screw. The interaction of the rotating horizontal screw and the stationary anvils gives a continuous kneading and mixing action so as to cause a continual subdivision and recombination of the rubber latex and the resin polymer solution being pretreated. Various breaker plates and die plates may be positioned in the apparatus to provide back pressure to increase the holdup time and shearing action which occurs inside the chamber. Generally, three plates may be employed, two of which are of the breaker variety and one of which is a die plate. The breaker plates are positioned internally and the die plate is generally positioned at the discharge end of the chamber. The plates contain holes ranging in size of from about ⅛ inch to about ⅝ inch. Each plate may contain the same size holes or each plate may have different size holes therein. Although the above discussion indicates that three die plates may be used, it is possible to employ as many as five and as few as one plate, depending upon the holdup time desired.

Although apparatus of the type described above is preferred, it should be understood that any other type of apparatus which will cause the continuous subdivision and recombination of the rubber latex and the resinous polymer solution may be used provided that such apparatus is conducive to the use thereof in a continuous process rather than a batch process.

After the pretreatment to form a dispersion, as mentioned above, said dispersion is continuously fed in conjunction with any other desired additives such as dyes, pigments, stabilizers, fillers, etc., to a devolatilizer-extruder where it is further mixed and compounded, along with the dialkyl phthalate and then devolatilized and extruded, all in a period of less than 5 minutes. In the devolatilizer-extruder, the pretreated mixture is worked in a chamber under heat and vacuum so that the new surfaces of the pretreated polymer mixture are continuously and rapidly exposed to vacuum to remove the monomeric solvent (and water where rubber in latex is employed) before extruding the product. The term devolatilization refers to the step in which the nonpolymeric material is removed from the pretreated blend of resin solution and rubbery dispersion. The apparatus which may be used to simultaneously devolatilize and extrude the material is of a commercially available design and comprises a chamber with one or more screws having a close tolerance with the chamber wall for compounding the material in its passage therethrough, and at least one vacuum chamber for removing the volatile components of the feed. The action of working the material under the close tolerance of the screws generates substantial heat which volatilizes the nonpolymer of the blend.

The devolatilizer-extruder may contain one or more interconnected sections, at least one being under vacuum. A preferred treatment wherein the material is worked for a total time of from 1 to 5 minutes employs two vacuum sections. In addition to the vacuum sections, the devolatilizer-extruder may contain a section following the vacuum sections which is atmospheric, i.e., not under vacuum, wherein various volatile or non-volatile modifiers, plasticizers or colorants etc., may be incorporated into the composition and extruded therewith if not previously added.

The vacuum sections of the devolatilizer-extruder are heated from temperatures of about 110° C. to about 245° C. and maintained under vacuum at an absolute pressure of from about 5 to 200 mm. mercury. Preferably, the temperature of the sectionally heated devolatilizer-extruder is maintained at from about 160° C. to about 210° C. and the vacuum is preferably maintained at from about 5 to about 200 mm. mercury absolute pressure. As the pretreated components and dialkyl phthalate are introduced into the devolatilizer-extruder, the increased temperature causes volatilization of the nonpolymer from the two polymer components. At the same time, because the extruder is maintained at subatmospheric pressures, the volatile material is withdrawn or devolatilized from the polymer-containing material. In this operation the purity of the polymer is carried to greater than 98%.

The total contact time of the pretreated material introduced into the devolatilizer-extruder to produce a material of greater than 98%, and generally better than 99%, polymer is less than about 5 minutes, and ordinarily from about 0.5 to about 3 minutes.

The amount of the elastic rubbery component employed may vary widely, however, a preferred composition is obtained when from a minor proportion, i.e., about 5% to about 45%, by weight, based on the total weight of the composition, of the rubbery elastomer (B) either in solution as a latex is employed, and correspondingly from about 95% to about 55%, by weight, of the resinous component (A) may be used.

The rubbery elastomers (B) employed may be any well known rubbery compound either natural or synthetic, many of which are available commercially both in solid form or as latices. In general, these elastomers comprise polymers and copolymers derived from diolefin compounds, such as butadiene-1,3; isoprene; 2,3-dimethylbutadiene-1,3; 1,4-dimethylbutadiene-1,3; and the like. The rubbery elastomeric compound (B) may consist entirely of a natural rubber or a synthetic rubbery diolefin, i.e., a homopolymer, although the diolefin rubbery polymer preferably contains a minor proportion, i.e., from about 5% to about 40% of an olefinic modifying compound, such as styrene, vinyl toluene, etc. or an acrylate, for example. The rubbery elastomers thus include such compounds as styrene-butadiene and butadiene-acrylonitrile rubbers, neoprene rubber, butyl rubbers. The styrene-butadiene synthetic rubbers generally contain about 75% butadiene and about 25% styrene and the nitrile-butadiene rubbers about 15% to about 35% acrylonitrile, the remainder being butadiene.

The rubbery component utilized may also preferably consist of grafted rubbers wherein the rubber backbone, i.e., polybutadiene or any of the rubbers listed above are grafted (by any known procedure) with graftable monomer. When such grafted rubbers are used, the backbone may be grafted with the monomer or monomers from which the resinous polymer (Component A) with which it is to be blended, is produced, or any graftable monomeric compound, i.e., any of those set forth hereinbelow.

Methacrylic acid esters may be employed as the main constituents in the hard resinous polymeric components of the compositions produced by the process of the present invention.

Compounds which may be used include methyl methacrylate, ethyl methacrylate, propyl methacrylate, isopropyl methacrylate, n-butyl methacrylate, isobutyl methacrylate, amyl methacrylate, hexyl methacrylate, their corresponding acrylates and the like.

Other monomers which may be used in the instant invention, alone or in admixture with the acrylic acid esters and methacrylic acid esters disclosed above, or other vinyl-type monomers, are the alkenyl aromatic compounds including styrene, methylstyrene, ethylstyrene, propylstyrene, n-butyl-styrene, t-butylstyrene, amylstyrene, hexylstyrene, octyl-styrene, chlorostyrene, bromostyrene, iodostyrene, fluorostyrene, methoxystyrene, ethoxystyrene, propoxystyrene, octoxystyrene, cyanostyrene, α-chlorostyrene, α-bromostyrene, α-iodostyrene, α-fluorostyrene, α-methylstyrene, α-ethylstyrene, α-octylstyrene and the like.

Other monomers which can be used to form polymeric component (A) and which can be used after having been polymerized either singly or in a plurality (two, three, four or any desired number), are such monomers as the unsaturated alcohol esters, more particularly the allyl, methallyl, vinyl, methvinyl, butenyl, etc., esters of saturated and unsaturated aliphatic and aromatic monobasic and polybasic acids such, for instance, as acetic, propionic, butyric, oxalic, succinic, adipic, fumaric, benzoic, phenylacetic, phthalic, terephthalic, etc., acids; the saturated monohydride alcohol esters, e.g., the mehyl, ethyl, propyl, isopropyl, butyl sec.-butyl amyl, etc., esters of ethylenically unsaturated aliphatic monobasic and polybasic acids; divinyl benzene; unsaturated ethers, e.g., ethyl vinyl ether, dially ether; unsaturated amides, for instance, acrylamide, and N-substituted acrylamides, e.g., N-methylol acrylamide; unsaturated ketones, e.g., methyl vinyl ketone.

Other examples of monomers that can be polymerized to form component (A) are the vinyl halides, more particularly vinyl fluoride, vinyl chloride, vinyl bromide and vinyl iodide, and the various vinylidene compounds, including the vinylidene halides, e.g., vinylidene chloride, vinylidene bromide, vinylidene fluoride and vinylidene iodide.

Among other monomers which may be used are, for example, compounds such as acrylonitrile, and other compounds e.g., the various substituted acrylonitriles (e.g., methacrylonitrile, ethacrylonitrile, phenylacrylonitrile, etc.). Other monomers copolymerizable with the instant novel monomers are given for instance, in U.S. Pat. No. 2,601,572, dated June 24, 1952, where examples are given both by classes and species.

The following examples are set forth for purposes of illustration only and are not to be construed as limitations on the present invention except as set forth in the appended claims. All parts and percentages are by weight unless otherwise specified.

Example 1

A resin solution of terpolymer comprising 68.7% methyl methacrylate, 20.3% styrene and 11.0% acrylonitrile, dissolved in 35% toluene; a grafted polybutadiene latex with a 3.0/1 ratio of polybutadiene to grafted monomers, the monomers constituting 88% methyl methacrylate, 9% styrene and 3% acrylonitrile, and 3.0%, based on the terpolymer and latex solids, of bis(2-ethylhexyl) phthalate are continually fed into a vessel containing two breaker plates and a die plate having holes of ½ inch, and ⅜ inch respectively. The mixture is continuously pretreated at a temperature of approximately 70° C. in said vessel for approximately 2.5 minutes. The pretreated mixture is then fed to a twin screw devolatilizer-extruder maintained at the feed end at a temperature of 80° C., at the extrusion end at a temperature of about 200° C. and at the central portion at a temperature of about 170° C. The resultant devolatilized molding composition is continuously extruded from the devolatilizer, after a retention time of about 3 minutes, to yield a composition having the properties set forth in Table I, below, when molded into test specimens. The composition properties are compared to those of a composition prepared exactly as in Example 1 with the exception of the added phthalate. The final composition contains 12% polybutadiene, 62% methyl methacrylate, 18% styrene and 8% acrylonitrile.

TABLE I

| Material | Percent transmission | Yellowness index | Percent haze | Melt index, 230° C., 5,000 g. | Specific gravity | DTL, 264 p.s.i., °C. | Izod notched, f.p.p.i. | Gardner impact | | Flexural strength, p.s.i. | Flexural modulus, p.s.i. | Tensile strength, p.s.i. | Tensile elongation, percent |
|---|---|---|---|---|---|---|---|---|---|---|---|---|---|
| | | | | | | | | In. lb./mil., 75° C. | In. lb./mil., 0 F.° | | | | |
| Composition of example 1 | 90.5 | 5.3 | 9.0 | 2.5 | 1.10 | 79 | 2.4 | 1.0 | 0.7 | 10,000 | 3.5×10⁵ | 6,600 | 3.1 |
| Composition without phthalate | 89.5 | 8.5 | 15.0 | 1.7 | 1.10 | 86 | 1.9 | 0.9 | 0.6 | 10,400 | 3.2×10⁵ | 6,600 | 3.3 |

EXAMPLES 2–9

The procedure of Example 1 is again followed except that the bis(2-ethylhexyl)phthalate used therein is replaced by various other phthalates. The results are set forth in Table II, below.

TABLE II

| Example | Phthalate | Transmission, percent | Haze, percent | Melt index, 230° C., 5,000 g. | DTL, 264 p.s.i., °C. | Izod notched, f.p.p.i. | Flexural strength, p.s.i. | Flexural modulus, p.s.i. | Tensile strength, p.s.i. | Tensile elongation, p.s.i. |
|---|---|---|---|---|---|---|---|---|---|---|
| 2 | n-Decyl isooctyl, 5% | 87.1 | 11.2 | 4.8 | 75 | 2.1 | 10,200 | 3.4×10⁵ | 6,200 | 3.2 |
| 3 | Dioctyl, 5% | 87.0 | 15.7 | 6.0 | 80 | 2.1 | 9,400 | 3.2×10⁵ | 5,900 | 3.2 |
| 4 | di-n-Butyl, 5% | 88.2 | 10.6 | 7.8 | 75 | 1.9 | 9,900 | 3.4×10⁵ | 5,900 | 3.1 |
| 5 | n-Butyl-2-ethylhexyl, 5% | 87.9 | 10.5 | 6.3 | 77 | 2.0 | 9,700 | 3.3×10⁵ | 5,900 | 3.1 |
| 6 | Diisodecyl, 5% | 86.6 | 12.1 | 5.1 | 78 | 2.2 | 9,800 | 3.3×10⁵ | 6,000 | 3.3 |
| 7 | 2-ethylhexyl isodecyl, 5% | 86.9 | 12.0 | 6.2 | 77 | 2.1 | 9,800 | 3.3×10⁵ | 5,900 | 3.3 |
| 8 | n-Decyl n-octyl, 5% | 87.5 | 11.4 | 7.8 | 75 | 2.0 | 9,400 | 3.3×10⁵ | 5,800 | 3.0 |
| 9 | Bis(2-ethylhexyl), 5% | 88.6 | 8.6 | 5.5 | 75 | 1.9 | 10,100 | 3.3×10⁵ | 6,100 | 3.4 |

EXAMPLE 10

The composition of Example 1, except that the phthalate is replaced with n-butyl-2-ethylhexylphthalate, is molded under varying molding conditions in order to determine the effect of extreme molding thereon. Similar tests are run on a second composition, identical with that of Example 1 but exclusive of the presence of any phthalate. The results are set forth in Table III, below.

TABLE III

| Molding conditions | Composition of example 1 | | Composition of example 1 without phthalate | |
|---|---|---|---|---|
| Melt temp. °F | 490 | 450 | 490 | 450 |
| Mold temp. °F | 110 | 50 | 110 | 50 |
| Haze percent: | | | | |
| 400 mm. wavelength | 7.2 | 9.5 | 9.0 | 19.0 |
| 480 mm. wavelength | 7.0 | 8.4 | 6.0 | 16.0 |
| 560 mm. wavelength | 6.4 | 7.4 | 5.0 | 14.3 |
| 640 μh. wavelength | 5.8 | 6.8 | 4.4 | 13.0 |
| Yellowness index: 550 mm. wavelength | 2.9 | | 5.4 | |

EXAMPLE 11

The procedure of Example 1 is again followed except that the concentrations of the polybutadiene, methyl methacrylate, styrene and acrylonitrile are adjusted so as to result in a final composition containing 8% polybutadiene, 64% methyl methacrylate, 20% styrene and 8% acrylonitrile. Comparable results are attained.

We claim:
1. In a continuous method for the production of a high impact molding composition of (A) from about 95–55% of a terpolymer of methyl methacrylate, styrene and acrylonitrile and, correspondingly, (B) from about 5–45% of polybutadiene grafted with styrene, methyl methacrylate and acrylonitrile by pretreating a mixture of a solution of polymer (A) in a volatile solvent, said solution having not more than 80%, by weight, of polymer (A) and a liquid dispersion of (B) at a temperature of between about 50° C. and about 110° C. and a pressure of less than 50 p.s.i. by holding said mixture at said temperature and pressure for a period of from about 1 minute to about 30 minutes while continuously subjecting said mixture to a subdivision and recombination effected by shearing so as to produce a uniform composition having both a microscopic and a macroscopic dispersion of said (A) and (B) and devolatilizing and extruding said composition at a temperature of from about 110° C. to about 245° C. and at an absolute pressure of less than 200 millimeters of mercury in a period of less than about 5 minutes, the improvement which comprises adding to said mixture, from about 0.5% to about 15.0%, by weight, based on the total weight of said polymers (A) and (B), of a dialkyl phthalate, said alkyl groups, individually, having from 4 to 10 carbon atoms, inclusive.

2. A method according to Claim 1 wherein said pretreating is conducted at a temperature of between about 70° C. and 100° C., a pressure of up to about 5 p.s.i. and a holding time of from about 2–10 minutes.

3. A method according to Claim 1 wherein said phthalate is di(2-ethylhexyl)phthalate.

4. A method according to Claim 1 wherein said phthalate is n-butyl-2-ethylhexyl phthalate.

5. A method according to Claim 1 wherein said phthalate is diisodecyl phthalate.

6. A method according to Claim 1 wherein said phthalate is n-decylisooctyl phthalate.

7. A method according to Claim 1 wherein said phthalate is di-n-butyl phthalate.

8. A method according to Claim 1 wherein said phthalate is 2-ethylhexyl isodecyl phthalate.

9. A method according to Claim 1 wherein said phthalate is dioctyl phthalate.

10. A method according to Claim 1 wherein said phthalate is n-decyl-n-octyl phthalate.

11. The product produced by the method of Claim 1.

References Cited

UNITED STATES PATENTS

| | | | |
|---|---|---|---|
| 3,345,321 | 10/1967 | Geurtsen | 260—34.2 |
| 3,284,396 | 11/1966 | Talalay | 260—31.8 DR |
| 3,194,778 | 7/1965 | Butzler | 260—31.8 M |
| 3,678,133 | 7/1972 | Ryan | 260—31.8 M |
| 3,725,332 | 4/1973 | Carrock | 260—31.8 M |
| 3,257,261 | 6/1966 | Hochberg | 260—31.8 M |
| 3,005,796 | 10/1961 | Dreisbach | 260—31.8 M |
| 2,941,978 | 6/1960 | Roche | 260—31.8 M |

MORRIS LIEBMAN, Primary Examiner

P. R. MICHL, Assistant Examiner

U.S. Cl. X.R.

260—4 R, 4 AR, 31.8 DR